Patented Mar. 4, 1941

2,233,406

UNITED STATES PATENT OFFICE 2,233,406

RESINOUS COMPOSITION AND METHOD OF MAKING THE SAME

Edmond F. Fiedler, Adams, Mass., assignor to General Electric Company, a corporation of New York No Drawing. Application April 27, 1938,
Serial No. 204,620

11 Claims. (Cl. 260—44)

The present invention relates broadly to resinous compositions and to methods of making the same. It is more particularly directed to the production of casting resins of the alkyd-phenol-aldehyde type which are convertible to the infusible, insoluble state by heat. The cured resins of this invention are capable of being machined and drilled easily, may be clear, translucent or opaque, and in general meet all the practical requirements of casting resins.

It has been known heretofore that alkyd-modified phenolic resins can be so prepared as to yield resinous compositions capable of being poured into molds, that is cast, and cured therein under heat to the infusible state. Casting resins so made are described, for example, in Kienle and Schlingman Patent No. 2,025,538, assigned to the same assignee as the present invention. In accordance with the Kienle and Schlingman invention a flexible alkyd resin having an acid number between 140 and 210 is used as an acid catalyst in promoting reaction between a phenol and an aldehyde such as paraformaldehyde.

I have discovered that a new series of resins can be produced by first reacting a phenolic body, preferably phenol ($C_6H_5OH$) with an excess of aldehyde, preferably an aqueous solution of an excess of formaldehyde or a compound engendering formaldehyde, in the presence of an alkaline catalyst. This reaction is carried out while agitating the mass at a temperature not exceeding substantially 100° C.

To the above phenol-aldehyde reaction product is added, prior to the complete separation of a resinous condensation product as an oily mass, a flexible A-stage alkyd resin having an acid number between approximately 140 and 210. Alkyd resins which are permanently flexible have been produced and are described and claimed in Kienle and Rohlfs Patent No. 1,897,260, which is assigned to the same assignee as the present invention. Briefly, such resins are prepared by reacting suitable proportions of aliphatic dicarboxylic acid, for example succinic acid, adipic acid and the like, and dihydric alcohol, such as ethylene glycol, with the usual alkyd resin ingredients, namely a polyhydric alcohol having preferably three or more hydroxyl groups in the molecule, for instance glycerol, and an aromatic polycarboxylic acid, such as phthalic acid or its anhydride. By varying the ratio of aliphatic dicarboxylic acid-dihydric alcohol ester to polyhydric alcohol aromatic polycarboxylic acid ester in the reaction mass, the degree of flexibility of the resinous compositions may be varied. Increasing, for example, the ratio of the former to the latter, increases the flexibility of the resulting resin. In accordance with the present invention the alkyd resin components are so proportioned and reacted for such time as to form a soluble, alkyd resin of the above-described acid number.

The amount of the alkyd resin incorporated with the phenol-aldehyde reaction product may be varied over a fairly wide range, depending upon the particular kind and amount of phenolic body, aldehyde and catalyst used, the particular reaction time and the temperatures employed. However, generally speaking the alkyd resin component will be less than 50 per cent by weight of the dehydrated or cured resinous mass.

The acid number of the alkyd resin to be incorporated with the phenol-aldehyde reaction product should not exceed substantially 210. Otherwise cured casting resins of suitable properties will not be obtained, since a large excess of unreacted alkyd resin components (indicated by an acid number above 210) has a detrimental effect upon the cured product. If the acid value is too low, for instance under approximately 140, more alkyd resin than is desirable is required to neutralize the alkalinity of the alkaline-catalyzed phenolic resin. Further, at lower acid values it becomes increasingly difficult to obtain hard, tough, practically useful cured casting resins.

To obtain light-colored products, materials of a high degree of purity should be used. The phenol should be a specially distilled material substantially free from bodies that would impart color to the cured resin. The catalyst should meet the specifications of the United States Pharmacopoeia for purity, or be of an equivalent grade. The alkyd resin should be almost water white. The purest available aldehyde should be employed.

The ratio of aldehyde such as formaldehyde to phenol preferably is within the ratio of 1 mol phenol to 1.05 to 4.5 mols formaldehyde. I have obtained best results by using 1 mol phenol to approximately 3 mols formaldehyde. By varying the ratio of phenol to formaldehyde, the rate of cure and strength of the final product may be varied.

The alkaline catalyst employed advantageously is one which has no darkening effect upon the cured resin. Hydroxides of the alkaline earth metals (calcium, strontium and barium) and hydroxides, carbonates, cyanides and borates of the alkali metals (lithium, sodium, potassium, rubidium and caesium) are examples of suitable catalysts, which may be used. Potassium cyanide, lithium carbonate, potassium hydroxide and sodium hydroxide were found to be particularly effective catalysts, their use resulting in the production of cured resins having the best combination of desirable properties (strength, machinability, appearance, toughness, etc.)

The amount of catalyst may be varied, for example from 0.5 to 5 per cent by weight of the phenolic body. The higher the reaction temperature approaches 100° C., the lower should be the amount of catalyst. For room temperature reaction a higher percentage of catalyst will be required as compared with reactions carried out under applied heat. At reaction temperatures of approximately 75° to 80° C. an amount of catalyst ranging from 1 to 3.5 per cent by weight of the phenol is usually effective. The percentage used in general will be somewhat lower, other conditions being the same, when hydroxides of the alkali metals are used, as compared with the corresponding alkali-metal salts such as carbonates, cyanides and borates.

The proportion of alkyd resin to phenolic resin depends upon the particular properties, for example toughness (as distinguished from brittleness and low strength) desired in the cured product. It also depends upon the kind and the amount of catalyst used, since the alkyd resin serves in most cases as the sole neutralizing agent of the base. Ordinarily, the alkyd resin constitutes from 5 to 45 per cent, and preferably from 10 to 30 per cent by weight of the dehydrated or cured resinous mass. In general, the harder it is desired that the cured resin should be, the less the amount of alkyd resin used.

When a strong base in relatively large amount is used as catalyst, it is sometimes advantageous to use less acidic alkyd resin than would be required to neutralize completely the alkalinity of the phenolic reaction product. In such case neutralization is completed by adding a suitable amount of a weak acid, for example a carboxylic acid such as oxalic, malonic, aconitic, tricarballylic and the like. Preferably I use an hydroxy acid such, for instance, as citric, tartaric or lactic acid. In this way the amount of alkyd resin required for neutralization may be materially reduced.

The initial reaction temperature is important. It should not exceed substantially 100° C. By reacting the phenol and formaldehyde at temperatures ranging between 60° and 90° C. the cured resin is of better color throughout than resins similarly produced by carrying out the initial reaction at a higher temperature. Best results consistent with minimum reaction time are obtained by reacting at temperatures of approximately 70° to 85° C. Temperatures varying from room temperature (20° to 35° C.) up to 60° C. also may be used, but a reaction time of from 8 to 16 hours or more, for example from 1 to 7 days in the case of room temperature reaction, then may be required before adding the alkyd resin.

The extent to which the reaction between the phenol and the aldehyde is allowed to proceed also is important. I have found that an A-stage alkyd resin is more compatible with the phenol alcohols and the initial phenol-aldehyde condensation products than with the more highly polymerized phenolic resins. As is well known, when a phenol and an aldehyde are reacted under alkaline conditions a phenol alcohol forms first. As the reaction proceeds, a condensation product is formed. The condensation product or resin that forms causes the mass to become milky or opalescent at first, and if the reaction is allowed to proceed further eventually will result in the separation of an aqueous layer and a thick, syrupy, oily resinous layer.

In accordance with the present invention the phenol and the aldehyde are intimately associated, for example by mixing, for a period sufficient to cause reaction therebetween but insufficient to cause complete separation, that is to say, insufficient to form a distinct layer of a resinous condensation product, before incorporating the alkyd resin. The alkyd resin may be added when the phenolic reaction product is in the form of a clear solution comprising mainly a mixture of phenol alcohols, in which case the condensation reaction between the phenol and the aldehyde may be allowed to proceed further in the presence of the alkyd resin. Or the alkyd resin may be incorporated in the phenolic resinous mass after the initial condensation reaction has started and the condensation product that results is dispersed through the mass to produce translucent to opaque effects when hot. In all cases the alkyd resin is added before the precipitation of the above-described oily layer.

In practice the extent of the reaction is controlled by the time of reaction. When reacting at a temperature of approximately 70° to 85° C., best results have been obtained when the phenol and aldehyde were reacted for from one to two hours. The longer the reaction time at such temperatures, the more viscous the resin becomes during subsequent dehydration. The casting of too viscous a resin results in a cured product containing bubbles of entrapped gas. Higher or lower reaction temperatures require shorter or longer time of reaction to obtain a dehydrated product of approximately the same viscosity.

The temperature at which the alkyd-phenol-aldehyde resin is dehydrated likewise is important. If a temperature of 100° C. is attained during dehydration, the cured resin forms star cracks which are objectionable from the standpoint of appearance and attainment of maximum strength. If the maximum temperature of dehydration is 90° C., the cured product will be darker than if the maximum is, for example, 70° to 85° C. In practicing the present invention it is important that the dehydration temperature does not exceed substantially 100° C., and preferably the mass is so dehydrated under reduced pressure that the maximum temperature attained is within the range of 70° to 85° C.

During the process of curing the cast resin in molds the temperature should not exceed substantially 100° C. If the cure temperature is too high, objectionable star cracks develop in the cured mass. The higher the cure temperature, the more rapid the cure but the darker the cured product. Too fast a cure seems to cause brittleness in the cured resin. I have found that best results are obtained by curing at a temperature which does not exceed substantially 85° C. and which preferably is of the order of 75° to 80° C. Lower curing temperatures, for example from 65° to 70° C. may be used, but the curing process then proceeds much more slowly.

When it is desired to color the resin a suitable dye or pigment is added, preferably shortly before or immediately after the completion of the dehydration of the resinous mass and while the resin is still in the reaction vessel.

In order that those skilled in the art better may understand how the present invention may be carried into effect, the following specific examples are given to illustrate the invention:

Example 1

An alkyd resin was prepared in accordance with the following formula:

| | Parts by weight |
|---|---|
| Glycerine (2 mols) | 184 |
| Phthalic anhydride (3 mols) | 444 |
| Adipic acid (½ mol) | 73 |
| Ethylene glycol (½ mol) | 31 |

The alkyl resin was prepared in the usual way by cooking the ingredients at 190° to 210° C., except that the reaction was stopped in the A-stage upon reaching an acid value of approximately 180 to 200 and a cure time of approximately 50 seconds when a small pill of the material was worked on a hot plate maintained at a temperature of about 200° C. The resin was poured into a shallow pan and broken up into small pieces for subsequent use. For convenience such soluble, A-stage resin will be referred to in the formulas which follow as 180–200 flexible alkyd resin.

In making the casting resin the following formula and procedure were used:

| | Parts by weight |
|---|---|
| Phenol | 190.0 |
| Aqueous formaldehyde (25%) | 488.0 |
| Sodium hydroxide | 4.4 |
| 180–200 flexible alkyd resin | 138.0 |

The sodium hydroxide was used in the form of a 10 per cent aqueous solution. A part of the phenol (118 parts) and all of the formaldehyde were stirred and reacted together in the presence of the sodium hydroxide at 75° to 80° C. for 1½ to 3 hours. The alkyd resin, previously dissolved in the remaining phenol (72 parts), was added to the reaction vessel and heating continued for an additional hour at 75° to 80° C. After dehydration under vacuum until dry the resulting thick, syrupy mass was poured into molds and cured therein at 80° to 100° C. for from 1 to 3 days.

Example 2

| | Parts by weight |
|---|---|
| Phenol | 118.0 |
| Aqueous formaldehyde (37½%) | 195.0 |
| Sodium hydroxide | 1.6 |
| 180–200 flexible alkyd resin | 82.0 |

The phenol, formaldehyde and the sodium hydroxide in the form of a 10 per cent aqueous solution were heated together with stirring for 2 hours at approximately 80° C., after which the alkyd resin in fluid state was added. The mass was dehydrated under vacuum until dry, requiring about 1⅓ hours. It was poured into molds and cured at approximately 80° C. for 42 hours. The cured resin was hard, tough and on an initial Charpy impact test showed an impact strength above 2 foot pounds. On a second test the sample broke at 1.35 foot pounds.

Example 3

| | Parts by weight |
|---|---|
| Phenol | 118 |
| Aqueous formaldehyde (37½%) | 320 |
| Potassium cyanide | 6 |
| 180–200 flexible alkyd resin | 61 |

The phenol, formaldehyde and the potassium cyanide dissolved in 20 parts water were stirred and heated together at 75° to 80° C. for 2¼ hours. Thereafter the alkyd resin melted to fluid state was added. The resinous solution was a reddish color, indicating that the liquid mass was still slightly alkaline. Citric acid was now added in the form of a 20 per cent solution, a few drops at a time, until the solution was neutralized as indicated by a change in color from red to a pale yellow. The mass was dehydrated under vacuum until dry.

In this and in all other examples herein given, the usual practice was to apply external heat throughout the period of dehydration. The temperature would drop to approximately 38° to 40° C., then rise as the dehydration proceeded. Generally, after from 2 to 3 hours the liquid resin would reach 75° to 80° C., and by controlling the degree of vacuum and the external heat was maintained at that temperature to the end of the dehydration period.

Resins prepared in accordance with the above formula, as well as others herein described, are poured into molds when apparently dry or, if desired, may be heated further at 75° to 80° C. until the desired viscosity has been obtained. Resins of this example cured to a hard, tough state in from 1 to 3 days when heated at about 80° C. The Charpy impact strength ranged from 1 to over 2 foot pounds.

Example 4

| | Parts by weight |
|---|---|
| Phenol | 118.00 |
| Aqueous formaldehyde (37½%) | 100.00 |
| Potassium cyanide | 2.18 |
| 180–200 flexible alkyd resin | 20.00 |

The phenol, formaldehyde and the potassium cyanide dissolved in 10 parts water were reacted together with stirring at 75° to 80° C. for 1½ hours, after which the alkyd resin in fluid state was added. The mass was dehydrated under reduced pressure until dry, requiring about 3 hours. The liquid resin was of low viscosity, having almost the fluidity of water when hot. After curing in molds for 7 days at 80° C. it became quite hard, showing a resistance to impact on the Charpy machine of 0.77 foot pounds.

Example 5

| | Parts by weight |
|---|---|
| Phenol | 118 |
| Aqueous formaldehyde (37½%) | 320 |
| Lithium carbonate | 3 |
| 180–200 flexible alkyd resin | 61 |

The lithium carbonate, dispersed in a suitable amount of water, for example 15 parts, was mixed with the phenol and formaldehyde. The mixture was stirred and reacted for from 1 to 2 hours, for example 1½ hours, at 75° to 80° C., after which the alkyd resin in molten state was added. The solution becomes a pale yellow color. Some carbon dioxide is given off, apparently as a result of reaction between the acid of the alkyd resin and some of the lithium carbonate which has not gone completely into solution. The mass was heated for an additional 30 minutes, after which it was dehydrated under vacuum. During dehydration, external heat was applied when necessary to reach a maximum temperature of about 95° C. The mass was dehydrated until dry, requiring about 3 hours. After curing in molds at about 75° to 80° C. for 5 days, a hard tough resin having an impact strength on the Charpy machine above 2 foot pounds was obtained.

Example 6

Same formula and procedure as under Example 5 with the exception that 2 parts lithium carbonate and 80 parts 180–200 flexible alkyd resin were used. The mass appeared to be dry after dehydrating under reduced pressure for 1½ hours. A hard, tough machinable resin was formed after curing in a mold for 4 days at 80° C.

Example 7

| | Parts by weight |
|---|---|
| Phenol | 118 |
| Aqueous formaldehyde (37½%) | 240 |
| Lithium hydroxide (dissolved in 15 parts hot water) | 3 |
| 180–200 flexible alkyd resin | 41 |

Same procedure and reaction time as described under Example 4. The mass was dehydrated under vacuum until dry. After curing in a mold for 5 days at 80° C. a clear, hard, water-resistant, oil-insoluble resin was obtained. It was extremely resistant to ultra-violet light and showed a Charpy impact strength of 1.13 foot pounds.

Example 8

| | Parts by weight |
|---|---|
| Phenol | 118 |
| Aqueous formaldehyde (37½%) | 320 |
| Sodium metaborate (Na$_2$B$_2$O$_4$.4H$_2$O) | 6 |
| 180–200 flexible alkyd resin | 80 |

The phenol, formaldehyde and the sodium borate dissolved in 10 parts water were reacted together with agitation for 2½ hours at 80° C., after which the melted alkyd resin was added. The mixed components were reacted together another 30 minutes at 80° C., thereafter being dehydrated under vacuum until dry. Clear, tough pieces, free from blisters or cracks, resulted upon curing in a mold at 85° C. for 40 hours.

Example 9

| | Parts by weight |
|---|---|
| Phenol | 118 |
| Aqueous formaldehyde (37½%) | 320 |
| Barium hydroxide | 2 |
| 180–200 flexible alkyd resin | 80 |

The phenol, formaldehyde and the barium hydroxide dissolved in 5 parts hot water were heated together at 85° C., while stirring, for 1½ hours. The alkyd resin in fluid state was added and the mass was dehydrated under vacuum until apparently dry and of suitable viscosity for ease in pouring. A hard, cured opaque resin resulted after curing in a mold for 5 days at 80° C.

By the method of this invention homogeneous, bubble-free casting resins of uniform characteristics from batch to batch are obtained. The rate of curing is comparable with, and in many cases better than that of casting resins produced by other methods and of different composition. The cured products are mechanically strong and of varying degrees of toughness, depending upon such factors as hereinbefore set forth. The strength of the cured resin, as measured by breaking a ½ inch diameter by 5 inches long cylinder on a Charpy test machine, ranges from about 0.7 foot pounds to above the measuring capacity of the machine, which is 2 foot pounds. The lower values are obtained at the lower formaldehyde to phenol ratios; also, when the resin is cured too long or formulated so as to cure too fast. Transparent as well as translucent or opaque effects may be produced by varying the formula and the extent of dehydration. The cured resins are water-resistant, oil-insoluble and extremely resistant to ultra-violet light.

The properties of the cured resins may be varied by using phenolic bodies other than pure phenol, for example cresol or mixtures of phenol and cresol, and aldehydes other than formaldehyde. However, I prefer to use phenol and fomaldehyde as starting materials. The flexibility of the cured resin also can be varied by using alkyd resins of varying ratios of dihydric alcohol-dibasic aliphatic acid ester to polyhydric alcohol-polybasic aromatic acid ester. With conditions otherwise the same, the cured casting resin will be more flexible the higher the ratio of the former to the latter.

The resins are adapted to be cast in any desired shape. They can be cast, for example, in tin, brass, glass or other molds. They can be turned easily on a lathe, or drilled, without chipping or cracking, and may be employed to make a wide variety of useful articles. Examples of such articles are rods, sheets, tubes, clock cases, door knobs, telephone receiving sets, radio cabinets, vases and umbrella handles.

The dehydrated resins before curing are sufficiently liquid that they may be poured without difficulty. Hence they may be used as impregnating agents without solvents. They may be employed, for example, to impregnate paper-insulated layer-wound coils which, after curing, are the equivalent of a molded coil.

What I claim as new and desire to secure by Letters Patent of the United States, is:

1. The method which comprises intimately associating one mol of a phenol with more than one mol of formaldehyde in the presence of an alkaline catalyst and at a temperature not exceeding substantially 100° C. for a period sufficient to react the phenol and formaldehyde but insufficient to form a distinct layer of a resinous condensation product, incorporating into the resulting liquid resinous reaction product a soluble alkyd resin having an acid number between approximately 140 and 210 at least partly to neutralize the said reaction product and to impart plasticity to the cured resinous mass, said alkyd resin being the product of reaction of an aromatic polycarboxylic acid, an alcohol having at least three hydroxyl groups, an aliphatic dicarboxylic acid and a dihydric alcohol, and dehydrating the liquid alkyd-modified resinous product under reduced pressure at a temperature not exceeding substantially 100° C.

2. The method which comprises mixing one mol of phenol with an aqueous solution of more than one mol of formaldehyde in the presence of a catalyst selected from the class consisting of the hydroxides, carbonates, cyanides and borates of the alkali metals at a temperature between 60° and 90° for a period sufficient to react the phenol and formaldehyde but insufficient to form a distinct layer of a resinous condensation product, incorporating into the resulting liquid resinous reaction product a soluble alkyd resin having an acid number between approximately 140 and 210 in an amount sufficient to impart plasticity and toughness to the cured resin but insufficient to neutralize completely the alkaline phenolic resinous reaction product, said alkyd resin being the product of reaction of an aromatic polycarboxylic acid, an alcohol having at least three hydroxyl groups, an aliphatic dicarboxylic acid and a dihydric alcohol, adding to the alkyd-modified resinous product an organic acid in an amount sufficient to neutralize the same, dehydrating the neutralized resinous mass under reduced pressure at a temperature not exceeding substantially 100° C., and casting and curing the product so produced at a temperature not less than 65° C. and not exceeding substantially 100° C.

3. The method which comprises reacting phenol with an aqueous solution of formaldehyde in the ratio of 1 mol phenol to from 1.05 to 4.5 mols formaldehyde, said reaction being carried out in the presence of a relatively small proportion of potassium cyanide as a catalyst at a temperature between 70° and 85° C. for a period sufficient to react the phenol and formaldehyde but insufficient to form a distinct layer of a resinous condensation product, incorporating into the resulting liquid resinous reaction product a soluble alkyd resin having an acid number between approximately 140 and 210 in an amount corresponding to from 5 to 45 per cent by weight of the completely dehydrated resinous mass, said alkyd resin being the product of reaction of an aromatic polycarboxylic acid, an alcohol having at least three hydroxyl groups, an aliphatic dicarboxylic acid and a dihydric alcohol, and dehydrating the liquid alkyd-modified resinous product under reduced pressure at a temperature not exceeding substantially 85° C.

4. The method which comprises reacting phenol and an aqueous solution of formaldehyde in the ratio of 1 mol phenol to approximately 3 mols formaldehyde in the presence of a relatively small proportion of lithium carbonate as a catalyst, said reaction being carried out at a temperature between 70° and 85° C. for from 1 to 2 hours to form a liquid reaction product, incorporating into the said product a soluble alkyd resin having an acid number between approximately 140 and 210 in an amount corresponding to from 10 to 30 per cent by weight of the cured resin, said alkyd resin being the product of reaction of an aromatic polycarboxylic acid, an alcohol having at least three hydroxyl groups, an aliphatic dicarboxylic acid and a dihydric alcohol, dehydrating the alkyd-modified liquid phenolic resinous product at a temperature not exceeding substantially 85° C., and casting and curing the product so produced at a temperature not less than 65° C. and not exceeding substantially 85° C.

5. A casting resin adapted to be cured at a temperature not less than 65° C. and not exceeding substantially 100° C., said resin being the product of the method of claim 1.

6. A hard, tough cast resin which is the product of the method of claim 2.

7. The method of preparing a casting resin adapted to be cured within the temperature range of 65° to 100° C. which comprises reacting one mol of a phenol and an aqueous solution of more than one mol of formaldehyde in the presence of an alkaline catalyst until a clear solution comprising mainly a mixture of phenol alcohols results, adding to the said clear solution a soluble acidic alkyd resin in an amount sufficient to neutralize the alkalinity due to the catalyst employed and to impart toughness and plasticity to the cured resin, the said alkyd resin having an acid number between approximately 140 and 210 and being the product of reaction of glycerine, phthalic anhydride, ethylene glycol and adipic acid, causing the phenol-formaldehyde reaction to proceed further in the presence of the said acidic alkyd resin, and dehydrating the resinous reaction product thereby obtained at a temperature not exceeding substantially 100° C.

8. The method which comprises effecting reaction between phenol and an aqueous solution of formaldehyde in the ratio of one mol phenol to more than one mol formaldehyde in the presence of an alkaline catalyst and at a temperature not exceeding substantially 100° C. for a period sufficient to form a liquid initial condensation product comprising a phenol alcohol, incorporating into the said condensation product a soluble alkyd resin having an acid number between approximately 140 and 210, said alkyd resin being the product of reaction of an aromatic polycarboxylic acid, an alcohol having at least three hydroxyl groups, an aliphatic dicarboxylic acid and a dihydric alcohol and constituting not exceeding substantially 50 per cent by weight of the completely dehydrated resinous mass, and dehydrating the resulting product to obtain a casting resin adapted to be cured within the temperature range of 65° to 100° C.

9. A casting resin which is the product of the method of claim 8.

10. A method as in claim 8 wherein the ratio of phenol to formaldehyde is of the order of one mol phenol to approximately three mols formaldehyde.

11. A method as in claim 8 wherein the alkaline catalyst is one selected from the class consisting of the hydroxides, carbonates, cyanides and borates of the alkali metals.

EDMOND F. FIEDLER.